(12) United States Patent
Ootsuki et al.

(10) Patent No.: US 12,626,846 B2
(45) Date of Patent: May 12, 2026

(54) FERRITE SINTERED MAGNET

(71) Applicant: TDK Corporation, Tokyo (JP)

(72) Inventors: Shirou Ootsuki, Tokyo (JP); Keisuke Kamiya, Tokyo (JP)

(73) Assignee: TDK Corporation, Tokyo (JP)

( * ) Notice: Subject to any disclaimer, the term of this patent is extended or adjusted under 35 U.S.C. 154(b) by 401 days.

(21) Appl. No.: 18/080,409

(22) Filed: Dec. 13, 2022

(65) Prior Publication Data

US 2023/0197322 A1     Jun. 22, 2023

(30) Foreign Application Priority Data

Dec. 17, 2021     (JP) ................................. 2021-205338

(51) Int. Cl.
*H01F 1/34* (2006.01)
*C04B 35/26* (2006.01)
*H01F 1/10* (2006.01)

(52) U.S. Cl.
CPC ......... *H01F 1/344* (2013.01); *C04B 35/2683* (2013.01); *C04B 2235/3227* (2013.01); *C04B 2235/3274* (2013.01); *C04B 2235/3427* (2013.01); *C04B 2235/85* (2013.01)

(58) Field of Classification Search
CPC ..... H01F 1/10; H01F 1/11; H01F 1/12; H01F 1/348; H01F 1/34; H01F 1/36; H01F 1/0315; H01F 1/344; H01F 10/205; C04B 35/26; C04B 35/2608; C04B 35/2633; C04B 35/2675; C04B 35/2691; C04B 35/2683; C04B 2235/767; C04B 2235/85; C04B 2235/3274

See application file for complete search history.

(56) References Cited

U.S. PATENT DOCUMENTS

| | | | |
|---|---|---|---|
| 2003/0168785 A1* | 9/2003 | Takami | ................... C04B 35/63 |
| | | | 252/62.63 |
| 2005/0098761 A1 | 5/2005 | Takami et al. | |
| 2013/0285779 A1 | 10/2013 | Kobayashi et al. | |
| 2019/0122792 A1 | 4/2019 | Nagaoka et al. | |

FOREIGN PATENT DOCUMENTS

| | | | |
|---|---|---|---|
| JP | 2005-045167 A | 2/2005 |
| JP | 2006-206360 A | 8/2006 |
| JP | 2009-188420 A | 8/2009 |
| JP | 4591684 B2 | 12/2010 |
| JP | 6769482 B2 | 10/2020 |
| WO | 2012/090935 A1 | 7/2012 |
| WO | WO-2017/200091 A1 | 11/2017 |

* cited by examiner

*Primary Examiner* — Matthew E. Hoban
*Assistant Examiner* — Lynne Edmondson
(74) *Attorney, Agent, or Firm* — Faegre Drinker Biddle & Reath LLP

(57) ABSTRACT

Provided is a ferrite sintered magnet including: magnetoplumbite type ferrite crystal grains; and a two-grain boundary interposed between the ferrite crystal grains. The two-grain boundary contains Ca and La, and an atomic ratio Ca/La at the two-grain boundary is 0.3 to 3.0.

4 Claims, 1 Drawing Sheet

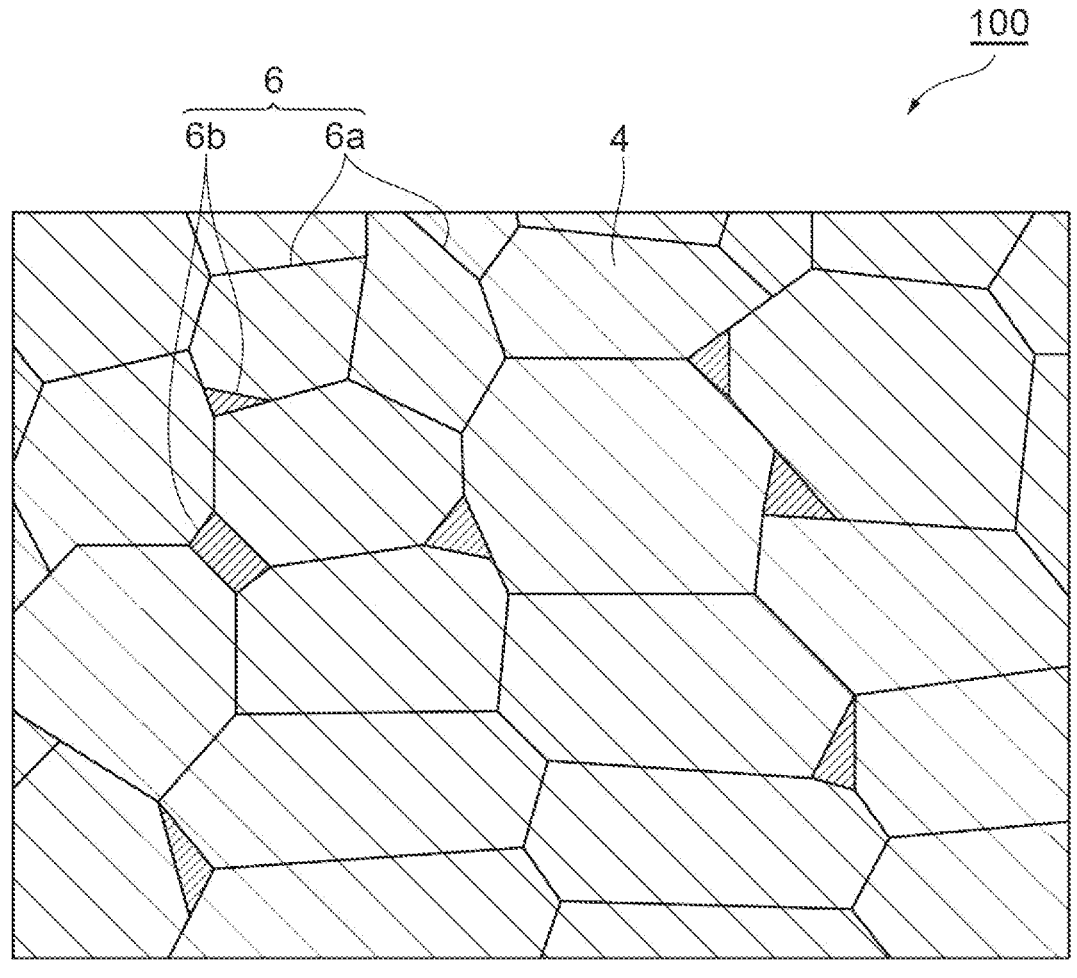

FERRITE SINTERED MAGNET

TECHNICAL FIELD

The present disclosure relates to a ferrite sintered magnet.

BACKGROUND

As a magnetic material that is used in a ferrite sintered magnet, Ba ferrite, Sr ferrite, and Ca ferrite which have a hexagonal crystal structure are known (for example, refer to Patent Literatures 1 to 3). As a crystal structure of the ferrites, a magnetoplumbite type (M type), a W type, and the like are known. Among these, the magnetoplumbite type (M type) ferrite has been mainly employed as a magnet material for motors and the like. The M-type ferrite is generally represented by General Formula of $AFe_{12}O_{19}$.

CITATION LIST

Patent Literatures

[Patent Literature 1] Japanese Unexamined Patent Publication No. 2006-206360A (Japanese Patent No. 4591684B)

[Patent Literature 2] Japanese Unexamined Patent Publication No. 2005-45167A

[Patent Literature 3] WO2017/200091A (Japanese Patent No. 6769482B)

SUMMARY

In an M-type ferrite sintered magnet, a residual magnetic flux density Br and a coercivity HcJ are likely to have a trade-off relationship. Here, in the related art, an attempt has been made to increase the residual magnetic flux density Br and the coercivity HcJ by adding an oxide of Si or Ca, or the like. However, in the M-type ferrite sintered magnet, when increasing the coercivity, the residual magnetic flux density tends to decrease significantly.

The present invention has been made in consideration of such a problem, and an object thereof is to provide a novel ferrite sintered magnet capable of increasing a coercivity without significantly reducing a residual magnetic flux density.

According to an aspect of the invention, there is provided a ferrite sintered magnet including: magnetoplumbite type ferrite crystal grains; and a two-grain boundary interposed between the ferrite crystal grains. The two-grain boundary contains Ca and La, and a Ca/La atomic ratio at the two-grain boundary is 0.3 to 3.0.

The Ca/La atomic ratio at the two-grain boundary may be 0.4 or more.

The two-grain boundary may further contain Si, and an Si/La atomic ratio at the two-grain boundary may be 0.02 to 2.0.

According to the invention, there is provided a novel ferrite sintered magnet capable of increasing a coercivity without significantly reducing a residual magnetic flux density.

BRIEF DESCRIPTION OF THE DRAWINGS

FIG. 1 is a schematic cross-sectional view of a ferrite sintered magnet.

DETAILED DESCRIPTION

An embodiment of the invention will be described in detail.

(Ferrite Sintered Magnet)

As illustrated in FIG. 1, a ferrite sintered magnet 100 according to the embodiment of the invention includes M-type ferrite crystal grains 4 having a magnetoplumbite type (M-type) crystal structure, and a grain boundary phase 6 existing between the M-type ferrite crystal grains 4.

(M-Type Ferrite Crystal Grain)

A crystal structure of the magnetoplumbite type pertains to a hexagonal system. A composition of the M-type ferrite crystal grains 4 is not particularly limited as long as the components thereof are oxides having the magnetoplumbite type crystal structure.

The magnetoplumbite type crystal structure can be expressed by the following Formula (III).

$$QX_{12}O_{19} \tag{III}$$

Here, a metal element $A^1$ and a partial metal element R enter Q (A site).

Fe, a metal element M, and a metal element R as the remainder enter X (B site).

Note that, in Formula (III), an atomic ratio of Q (A site) and X (B site) to O actually shows a value that slightly deviates from the above-described range, and thus the atomic ratio may slightly deviate from the above-described numerical value, for example, by approximately 10%.

The M-type ferrite crystal grains 4 can contain Fe and at least one kind of metal element $A^1$ selected from the group consisting of Ca, Sr, Ba, and Pb. In addition, the M-type ferrite crystal grains 4 can contain at least one kind of metal element R selected from the group consisting of Bi and rare-earth elements, and/or at least one kind of metal element M selected from the group consisting of zinc (Zn), copper (Cu), manganese (Mn), aluminum (Al), cobalt (Co), nickel (Ni), and chromium (Cr). The rare-earth elements are Sc, Y, La, Ce, Pr, Nd, Pm, Sm, Eu, Gd, Tb, Dy, Ho, Er, Tm, Yb, and Lu.

For example, the composition of the M-type ferrite crystal grains may be expressed by Formula (1).

$$A^1Fe_{12}O_{19} \tag{1}$$

A part of Fe may be substituted with the metal element M. An atomic ratio of Fe may be 50% or more.

The ferrite crystal grains can be Sr ferrite in which Sr occupies 34 at % or more of $A^1$, can be Ba ferrite in which Ba occupies 34 at % or more of $A^1$, can be Ca ferrite in which Ca occupies 34 at % or more of $A^1$, or may be Pb ferrite in which Pb occupies 34 at % or more of $A^1$. In the Sr ferrite, the Ba ferrite, the Ca ferrite, and the Pb ferrite, Sr, Ba, Ca, and Pb can be the maximum components in the atomic ratio of $A^1$, respectively.

The ferrite crystal grains may contain Ca, the metal element R, Fe, and the metal element M. A metal composition of the M-type ferrite may be, for example, the following General Formula (5).

$$Ca_aA^2_bR_cFe_dM_e \tag{5}$$

In Formula (5), $A^2$ is at least one selected from the group consisting of Sr, Ba, and Pb; a may be, for example, 0.15 or more and 0.7 or less, b may be, for example, 0 or more and 0.5 or less, c may be, for example, 0.3 or more and 0.85 or less, d may be more than 9.35 and less than 11.90, and e may be 0.1 or more and 0.5 or less. The sum of a, b, and c is 1.

a in Formula (5) may be 0.20 or more, or 0.30 or more. a may be 0.65 or less, or may be 0.60 or less.

b in Formula (5) may be 0.01 or more, 0.02 or more, or 0.03 or more from the viewpoint that a ratio of a heterogeneous phase is reduced, and Br, HcJ, and squareness are further improved. From the same viewpoint, b may be 0.40 or less, or 0.45 or less.

c in Formula (5) may be 0.35 or more, or 0.40 or more from the viewpoint that Br is further improved and low-temperature demagnetization of the coercivity tends to be suppressed. From the same viewpoint, c may be 0.80 or less, or 0.75 or less.

d in Formula (5) may be 9.50 or more or 9.70 or more from the viewpoint of raising magnetization and further reducing a different phase, and may be 11.80 or less or 11.78 or less from the viewpoint that Br, HcJ, and the squareness are further improved.

e in Formula (5) may be 0.15 or more, 0.20 or more, or 0.25 or more from the viewpoint of raising the magnetization and the coercivity and further reducing the different phase. From the same viewpoint, m in Formula (1) may be 0.48 or less, or 0.47 or less.

R in Formula (5) preferably includes at least La, and a ratio of La in R can be 50 at % or more, 70 at % or more, 80 at % or more, 90 at % or more, or 95 at % or more.

In Formula (5), M preferably includes at least Co, and a ratio of Co in M can be 50 at % or more, 70 at % or more, 80 at % or more, 90 at % or more, or 95 at % or more.

A mass fraction of the M-type ferrite in the M-type ferrite crystal grains is preferably 90% or more, more preferably 95% or more, and still more preferably 97% or more.

A mass ratio of the M-type ferrite crystal grains (main phase) in total crystal grains in the ferrite sintered magnet is preferably 90% or more, more preferably 95% or more, and still more preferably 97% or more. As described above, when reducing a mass ratio of a crystal phase (heterogeneous phase) different from the M-type ferrite phase, magnetic characteristics can be further enhanced. The mass ratio (%) of the M-type ferrite phase in the total crystal grains of the ferrite sintered magnet can be confirmed by obtaining an existence ratio (mol %) of the M-type ferrite phase with X-ray diffraction. The existence ratio of the M-type ferrite phase is calculated by mixing powder samples of each of M-type ferrite, ortho-ferrite, hematite, spinel, and W-type ferrite at a predetermined ratio, and comparing and calculating X-ray diffraction intensities thereof.

An average grain size of the M-type ferrite crystal grains in the ferrite sintered magnet may be, for example, 5 μm or less, 4.0 μm or less, or 0.5 to 3.0 μm. When having the average grains size, the coercivity can be raised. The average grain size of the ferrite crystal grains can be obtained by using a cross-sectional observation image with a TEM or SEM. Specifically, a cross-sectional area of each crystal grain in an SEM or TEM cross-section including several hundreds of ferrite crystal grains is obtained by image analysis, and a diameter (equivalent circle diameter) of a circle having the cross-sectional area is defined as a grain size of the crystal grain on the cross-section, thereby measuring a grain size distribution. A number-basis average value of the grain size of the ferrite crystal grains is calculated from a measured number-basis grain size distribution. The average value measured in this manner is set as an average grain size of the ferrite crystal grains.

The grain boundary phase 6 is disposed between the M-type ferrite crystal grains 4. Main components of the grain boundary phase 6 are oxides, and include at least La and Ca. In addition to this, the grain boundary phase can contain a metalloid element such as boron (B) and silicon (Si); the metal element $A^2$ selected from the group consisting of strontium (Sr), barium (Ba), and lead (Pb); iron (Fe); the metal element R; and at least one kind in the metal element M selected from the group consisting of manganese (Mn), zinc (Zr), chromium (Cr), cobalt (Co), nickel (Ni), copper (Cu), aluminum (Al), and the like, or a combination of arbitrary two or more kinds thereof. The oxides can occupy 90 mass % or more of the grain boundary phase 6, preferably 95 mass % or more, and more preferably 97 mass % or more.

The kind of the metal element contained in the grain boundary phase 6 may the same as the kind of the metal element contained in the M-type ferrite crystal grains 4, or may not be the same as each other.

As illustrated in FIG. 1, the grain boundary phase 6 can include a two-grain boundary 6a formed between two pieces of the M-type ferrite crystal grains 4, and a multi-grain boundary 6b surrounded by three or more pieces of the M-type ferrite crystal grains 4. Existence of the multi-grain boundary 6b is arbitrary.

The two-grain boundary 6a contains Ca and La, and a Ca/La atomic ratio in the two-grain boundary 6a is 0.3 to 3.0. The Ca/La atomic ratio in the two-grain boundary 6a is preferably 0.4 or more.

It is considered that La contributes to crystallization of the grain boundary phase, and Ca (CaO) contributes to amorphization of the grain boundary phase. When the degree of amorphousness of the grain boundary phase is high, magnetization of the grain boundary phase decreases, and thus the coercivity of the sintered magnet is improved, but residual magnetization tends to decrease. On the other hand, when the degree of crystallinity of the grain boundary phase is high, magnetization of the grain boundary phase becomes high, and the residual magnetization of the sintered magnet is maintained, but it is considered that it is difficult to raise the coercivity. In this embodiment, since the ratio of Ca and La in the grain boundary phase is appropriately set, it is considered that the coercivity can be raised while maintaining the residual magnetization of the sintered magnet.

The ratio of Ca in total metal elements in the two-grain boundary 6a can be 1.0 to 20.0 at %. The ratio of La in the total metal elements in the two-grain boundary 6a can be 3.0 to 20.0 at %.

The atomic ratio of Ca and La in the total metal elements in the two-grain boundary 6a may be larger than, smaller than, or the same as the atomic ratio of Ca and La in the total metal elements of the ferrite crystal grains 4. The two-grain boundary 6a may contain the metal element R other than La and/or the metal element $A^2$ other than Ca in addition to La and Ca. In addition, the two-grain boundary 6a may contain the metal element M.

The two-grain boundary can further contain Si, and an Si/La atomic ratio in the two-grain boundary 6a is preferably 0.02 to 2.0. In a grain boundary phase that contains Si to a certain extent, the effect of this embodiment is high, but this embodiment can be executed even when the amount of Si is less than the above-described range.

In a case where an average thickness of the two-grain boundary 6a of the ferrite sintered magnet is set to d, d can be 1 nm or less. With regard to the average thickness d, for example, a measurement value at the central portion of a two-grain boundary in which both ends are multi-grain boundaries is measured with respect to other 10 two-grain boundaries, and an average value thereof can be set as the average thickness d.

In a cross-section of the ferrite sintered magnet, an area ratio of the grain boundary phase 6 in the sum of the ferrite crystal grains 4 and the grain boundary phase 6 can be set to 0.01 to 5%.

A composition of the entirety of the ferrite sintered magnet is not particularly limited. A metal composition of the entirety of the ferrite sintered magnet may satisfy Formula (5).

The ferrite sintered magnet can contain silicon (Si). The content of Si in the ferrite sintered magnet is preferably 0.01 to 1.3 mass %, more preferably 0.01 to 0.5 mass %, and still more preferably 0.01 to 0.36 mass %, in terms of $SiO_2$. When an excessively large amount of $SiO_2$ is contained, Br tends to decrease, and when an excessively small amount of $SiO_2$ is contained, HcJ tends to decrease. Accordingly, when the content of $SiO_2$ is set within the above-described range, an optimal grain boundary phase is formed, and high magnetic characteristics are likely to be obtained.

The ferrite sintered magnet can contain boron (B). The content of B in the ferrite sintered magnet is 0.001 to 0.9 mass % in terms of $B_2O_3$. From the viewpoint of further raising the coercivity and the squareness (Hk/HcJ) of the ferrite sintered magnet, the content of B is preferably 0.01 mass % or more in terms of $B_2O_3$. In addition, from the viewpoint of further raising the residual magnetic flux density (Br) of the ferrite sintered magnet, the content of B is preferably 0.4 mass % or less, and more preferably 0.23 mass % or less, in terms of $B_2O_3$.

In addition to the components, impurities contained in a raw material or unavoidable component derived from a manufacturing facility may be contained in the ferrite sintered magnet. Examples of these components include oxides of magnesium (Mg), titanium (Ti), molybdenum (Mo), vanadium (V), and the like. The total content of these oxides is preferably 0.06 mass % or less.

The content ratio of the metal elements in the ferrite crystal grains and the grain boundary phase can be measured by STEM-EDX, and the content ratio of the metal elements in the entirety of the sintered magnet can be measured by fluorescent X-ray analysis, inductively coupled plasma emission spectral analysis (ICP emission spectral analysis), or the like.

A shape of the ferrite sintered magnet is not particularly limited, and examples of the shape include various shapes such as an arc segment (C-type) shape of which an end surface is curved to form an arc shape, and a flat plate shape.

The ferrite sintered magnet can be used as a rotary electric machine such as a motor and a generator, a magnet for a speaker and a headphone, a magnetron tube, a magnetic field generating device for MRI, a clamper for CD-ROM, a sensor for a distributor, a sensor for ABS, a fuel oil level sensor, a magnet latch, or a magnetic field generating member such as an isolator. In addition, the ferrite sintered magnet can also be used as a target (pellet) when forming a magnetic layer of a magnetic recording medium by a vapor deposition method, a sputtering method, or the like.

(Method of Manufacturing Ferrite Sintered Magnet)

Next, an example of a method of manufacturing the ferrite sintered magnet will be described. A manufacturing method to be described below includes a blending process, a calcination process, a pulverization process, an additional powder mixing process, a molding process, and a firing process. Details of the respective processes will be described below.

(Blending Process)

The blending process is a process of preparing a raw material powder for calcination. The raw material powder for calcination contains ferrite constituent elements. That is, the raw material powder contains the metal element A' and Fe, and contains the metal element M and R as necessary. In the blending process, it is preferable that a mixture of powders containing respective elements is mixed and is pulverized for 1 to 20 hours by an attritor, a ball mill, or the like to obtain the raw material powder.

Examples of the powders containing the respective elements include elementary substances, oxides, hydroxides, carbonates, nitrates, silicates, and organic metal compounds of the respective elements. One powder may contain two or more metal elements, or one powder may contain substantially only one metal element.

Examples of a Ca-containing powder include $CaCO_3$. Examples of an Sr-containing powder include $SrCO_3$. Examples of a Ba-containing powder include $BaCO_3$. Examples of an La-containing powder include $La_2O_3$ and $La(OH)_3$. Examples of an Fe-containing powder include $Fe_2O_3$. Examples of a Co-containing powder include $Co_3O_4$.

A ratio of each metal element in the raw material powder can be appropriately set in conformity to a composition of the ferrite crystal grains.

An average particle size of the raw material powder is not particularly limited, and for example, the average particle size is 0.1 to 2.0 μm.

After the blending process, it is preferable that the raw material composition is dried, and a coarse particle is removed by a sieve as necessary.

(Calcination Process)

In the calcination process, the raw material powder obtained by the blending process is calcined to obtain a calcined body. For example, the calcination is preferably performed in an oxidizing atmosphere such as the air. For example, a calcination temperature may be 1100° C. to 1400° C., or 1100° C. to 1350° C. For example, the calcination time may be 1 minute to 10 hours, or 1 minute to 3 hours. A ratio of a ferrite phase (M phase) in the calcined body that is obtained by the calcination and contains ferrite crystal grains may be, for example, 70 mass % or more, or 75 mass % or more. The ratio of the ferrite phase can be obtained in a similar manner as in the ratio of the ferrite phase in the ferrite sintered magnet.

(Pulverization Process)

In the pulverization process, the calcined body that becomes granular or lumpy due to the calcination process is pulverized to obtain a ferrite powder. For example, the pulverization process may be performed by a two-step process of pulverizing the calcined powder into a coarse powder (coarse pulverization process) and of finely pulverizing the coarse powder (fine pulverization process).

For example, the coarse pulverization can be performed by using a vibration mill or the like until an average particle size of the calcined body becomes 0.1 to 5.0 μm.

In the fine pulverization, the coarse powder obtained by the coarse pulverization is pulverized by a wet attritor, a ball mill, a jet mill, or the like. In the fine pulverization, pulverization can be performed so that the average particle size of obtained particles becomes approximately 0.08 to 2.0 μm. A specific surface area (obtained, for example, by a BET method) of a fine powder is set to, for example, approximately 7 to 12 $m^2/g$. The appropriate pulverization time is different depending on a pulverization method, for example, in a case of the wet attritor, the pulverization time is 30 minutes to 10 hours, and in wet pulverization by the ball mill is 10 to 50 hours. A specific surface area of an obtained powder can be measured by using a commercially available BET specific surface area measuring device (product name: HM model-1210 manufactured by MOUNTECH Co., Ltd.).

In the fine pulverization process, for example, a polyvalent alcohol expressed by a general formula $C_n(OH)_nH_{n+2}$ may be added in order to raise magnetic orientation of a sintered body obtained after firing. n in the general formula may be, for example, 4 to 100 or 4 to 30. Examples of the polyvalent alcohol include sorbitol. In addition, two or more kinds of polyvalent alcohols can be used in combination. In addition, other known dispersants may be used in combination in addition to the polyvalent alcohol.

In a case of adding the polyvalent alcohol, an addition amount may be, for example, 0.05 to 5.0 mass % or 0.1 to 3.0 mass % with respect to an addition target (for example, a coarse powder). Note that, the polyvalent alcohol added in the fine pulverization process is thermally decomposed and removed in a firing process to be described later.

(Additional Powder Mixing Process)

Next, the ferrite powder and an additional powder are mixed to obtain a mixed powder.

The additional powder may be mixed to the pulverized ferrite powder obtained in the pulverization process, but it is preferable that the additional powder is added to the powder during the pulverization process, and mixing between the ferrite powder and the additional powder is performed simultaneously with pulverization of the calcined body.

The additional powder contains at least Ca and La. An atomic ratio of La and Ca of the additional powder may be appropriately adjusted in correspondence with a desired metal atomic ratio in the grain boundary phase. Furthermore, the additional powder may contain a metal element (for example, the metal element $A^2$, the metal element R other than La, the metal element M, Fe, and the like) other than Ca and La, and/or a metalloid element such as Si and B. A composition of the grain boundary phase after sintering greatly depends mainly on metal and metalloid components in the additional powder, but a metal in the additional powder may diffuse into a main phase or a metal of the main phase may diffuse to the grain boundary phase, and thus the composition of the grain boundary phase is not equal to the metal and metalloid composition of the additional powder.

The amount of the additional powder is preferably 0.1 to 7 mass % with respect to the mass of the ferrite powder.

In a case of performing pulverization of the calcined body in two steps, the additional powder may be added before or after the coarse pulverization, or the additional powder may be divided into two parts and respectively added before and after the coarse pulverization.

(Molding Process)

In the molding process, the mixed powder obtained in the additional powder mixing process (for example, a pulverization process) is molded in a magnetic field to obtain a molded body. Molding may be performed by a method of either dry molding or wet molding. Molding is preferably performed by wet molding from the viewpoint of raising magnetic orientation.

In a case of performing molding by wet molding, for example, the above-described fine pulverization process is performed in a wet manner to obtain slurry, and then the slurry is concentrated to a predetermined concentration to obtain slurry for wet molding. Molding can be performed by using the slurry for wet molding. Concentration of the slurry can be performed by centrifugation, filter press, or the like. The content of the ferrite crystal grains in the slurry for wet molding is, for example, 30 to 80 mass %. In the slurry, examples of a dispersion medium that disperses the ferrite crystal grains include water. A surfactant such as gluconic acid, gluconate, and sorbitol may be added to the slurry. As the dispersion medium, a non-aqueous solvent may be used. As the non-aqueous solvent, an organic solvent such as toluene or xylene can be used. In this case, a surfactant such as oleic acid may be added. Note that, the slurry for wet molding may be prepared by adding a dispersion medium or the like to ferrite crystal grains in a dried state after fine pulverization.

In the wet molding, the slurry for wet molding is molded in a magnetic field. In this case, a molding pressure is, for example, 9.8 to 196 MPa (0.1 to 2.0 tons/cm²). For example, a magnetic field that is applied is 398 to 1194 kA/m (5 to 15 kOe).

(Firing Process)

In the firing (main firing) process, the molded body obtained in the molding process is fired to obtain a ferrite sintered magnet. Firing of the molded body can be performed in an oxidizing atmosphere such as in the air. A firing temperature may be, for example, 1050° C. to 1300° C. or 1080° C. to 1290° C. In addition, the firing time (time for which the firing temperature is maintained) is, for example, 0.5 to 3 hours.

In the firing process, for example, heating may be performed at a temperature-raising rate of approximately 0.5° C./minute from room temperature to approximately 100° C. before reaching a sintering temperature. According to this, the molded body can be sufficiently dried before sintering is progressed. In addition, the surfactant added in the molding process can be sufficiently removed. Note that, the treatment may be performed at the beginning of the firing process or may be performed separately prior to the firing process.

Furthermore, from the viewpoint of raising the Ca/La ratio in the two-grain boundary, a temperature-lowering rate when lowering a temperature from the firing temperature to 1000° C. is preferably set to 1 to 10° C./min, and more preferably less than 2° C./min. When slowing down the temperature-lowering rate in this manner, there is a tendency that Ca is likely to segregate to the grain boundary phase.

As described above, the ferrite sintered magnet can be manufactured.

EXAMPLES

The contents of the invention will be described in more detail with reference to Examples and Comparative Examples, but the invention is not limited to the following Examples.

Comparative Examples A1 to A3, and Examples A1 to A11

As a raw material, powders of barium carbonate ($BaCO_3$), calcium carbonate ($CaCO_3$), strontium carbonate ($SrCO_3$), lanthanum hydroxide ($La(OH)_3$), iron oxide ($Fe_2O_3$), and cobalt oxide ($Co_3O_4$) were prepared.

The raw material powders were blended so that a metal atomic ratio becomes a metal composition as shown in Table 1. Mixing and pulverization were performed by using a wet attritor and a ball mill to obtain a slurry (blending process). After the slurry was dried, and a coarse particles were removed, calcination was performed at 1310° C. in the air to obtain a calcined powder (calcination process).

TABLE 1

| | Metal ratio (atomic ratio) of raw material powder (main phase) | | | | | | Addition amount with respect to calcined object of raw material powder | Composition of additional powder (molar ratio) | | | Temperature lowering rate from highest temperature of main firing to 1000° C. | Atomic ratio of two-grain boundary | | Br | Br ratio α with respect to Br in Comparative Example | HcJ | HcJ ratio β with respect to HcJ in Comparative Example | |
|---|---|---|---|---|---|---|---|---|---|---|---|---|---|---|---|---|---|---|
| | La | Ca | Sr | Ba | Fe | Co | wt % | SiO₂ | CaCO₃ | La(OH)₃ | (° C./min) | Ca/La | Si/La | (mT) | A1 | (kA/m) | A1 | α + β |
| Comparative Example A1 | 0.42 | 0.58 | 0 | 0 | 10.1 | 0.3 | 0 | 0.00 | 0.00 | 0.00 | 5 | 0.21 | — | 458.0 | 100% | 244.0 | 100% | 200% |
| Example A1 | 0.42 | 0.58 | 0 | 0 | 10.1 | 0.3 | 1 | 0.33 | 0.33 | 0.33 | 5 | 0.30 | 2.10 | 424.0 | 93% | 285.0 | 117% | 209% |
| Example A2 | 0.42 | 0.58 | 0 | 0 | 10.1 | 0.3 | 1 | 0.31 | 0.38 | 0.31 | 5 | 0.41 | 2.20 | 422.0 | 92% | 289.0 | 118% | 211% |
| Example A3 | 0.42 | 0.58 | 0 | 0 | 10.1 | 0.3 | 1 | 0.29 | 0.41 | 0.29 | 5 | 0.76 | 2.20 | 420.0 | 92% | 297.0 | 122% | 213% |
| Example A4 | 0.42 | 0.58 | 0 | 0 | 10.1 | 0.3 | 1 | 0.28 | 0.44 | 0.28 | 5 | 1.20 | 2.10 | 415.0 | 91% | 302.0 | 124% | 214% |
| Example A5 | 0.42 | 0.58 | 0 | 0 | 10.1 | 0.3 | 1 | 0.26 | 0.47 | 0.26 | 5 | 3.00 | 2.20 | 401.0 | 88% | 309.0 | 127% | 214% |
| Comparative Example A2 | 0.42 | 0.58 | 0 | 0 | 10.1 | 0.3 | 1 | 0.25 | 0.50 | 0.25 | 5 | 3.20 | 2.10 | — | — | — | — | — |
| Example A6 | 0.42 | 0.58 | 0 | 0 | 10.1 | 0.3 | 1 | 0.02 | 0.49 | 0.49 | 5 | 0.31 | 0.01 | 457.0 | 100% | 258.0 | 106% | 206% |
| Example A7 | 0.42 | 0.58 | 0 | 0 | 10.1 | 0.3 | 1 | 0.05 | 0.48 | 0.48 | 5 | 0.31 | 0.02 | 452.0 | 99% | 274.0 | 112% | 211% |
| Example A8 | 0.42 | 0.58 | 0 | 0 | 10.1 | 0.3 | 1 | 0.31 | 0.34 | 0.34 | 5 | 0.30 | 2.00 | 429.0 | 94% | 284.0 | 116% | 210% |
| Example A9 | 0.42 | 0.58 | 0 | 0 | 10.1 | 0.3 | 1 | 0.15 | 0.46 | 0.38 | 5 | 0.40 | 0.10 | 456.0 | 100% | 289.0 | 118% | 218% |
| Example A10 | 0.42 | 0.58 | 0 | 0 | 10.1 | 0.3 | 1 | 0.29 | 0.41 | 0.29 | 1 | 1.15 | 2.25 | 416.0 | 91% | 300.0 | 123% | 214% |
| Example A11 | 0.42 | 0.58 | 0 | 0 | 10.1 | 0.3 | 1 | 0.29 | 0.41 | 0.29 | 8 | 0.48 | 2.10 | 422.0 | 92% | 287.0 | 118% | 210% |
| Comparative Example A3 | 0.42 | 0.58 | 0 | 0 | 10.1 | 0.3 | 1 | 0.29 | 0.41 | 0.29 | 20 | 0.29 | 2.00 | 425.0 | 93% | 250.0 | 102% | 195% |

The obtained calcined powder was coarsely pulverized by a small-sized rod vibration mill to obtain a coarse powder (coarse pulverization process).

Raw material powders were blended to be a metal composition as shown in Table 1, thereby obtaining an additional powder. After the additional powder was added to the coarse powder to be 1.0% with respect to the mass of the coarse powder, the mixed powder was finely pulverized by using a wet-type ball mill to obtain a slurry containing ferrite crystal grains (pulverization and additional powder mixing process).

A water content in the slurry obtained after the fine pulverization was adjusted to obtain a slurry for wet molding. The slurry for wet molding was molded in an applied magnetic field of 796 kA/m (10 kOe) by using a wet-type magnetic field molding device to obtain a molded body having a circular columnar shape of 30 mm diameter×15 mm thickness (molding process).

The obtained molded body was dried in the air at room temperature, and was fired in the air at 1280° C. (firing (main firing) process). A temperature lowering rate when lowering a temperature from the firing temperature to 1000° C. was set as shown in Table 1. In this manner, a ferrite sintered magnet having a circular columnar shape was obtained.

Comparative Example B1, and Example B1 and B2

Processes were performed in a similar manner as in Example 1 except that various conditions were changed as shown in Table 2.

TABLE 2

| | Metal ratio (atomic ratio) of raw material powder (main phase) | | | | | | Addition amount with respect to calcined object of raw material powder | Composition of additional powder (molar ratio) | | | Temperature lowering rate from highest temperature of main firing to 1000° C. | Atomic ratio of two-grain boundary | | Br | Br ratio α with respect to Br in Comparative Example | HcJ | HcJ ratio β with respect to HcJ in Comparative Example | |
|---|---|---|---|---|---|---|---|---|---|---|---|---|---|---|---|---|---|---|
| | La | Ca | Sr | Ba | Fe | Co | wt % | SiO$_2$ | CaCO$_3$ | La(OH)$_3$ | (° C./min) | Ca/La | Si/La | (mT) | B1 | (kA/m) | B1 | α + β |
| Comparative Example B1 | 0.55 | 0.4 | 0 | 0.05 | 10.1 | 0.3 | 0 | 0.00 | 0.00 | 0.00 | 5 | 0.17 | — | 463.0 | 100% | 252.0 | 100% | 200% |
| Example B1 | 0.55 | 0.4 | 0 | 0.05 | 10.1 | 0.3 | 1 | 0.33 | 0.33 | 0.33 | 5 | 0.30 | 2.10 | 448.0 | 97% | 283.0 | 112% | 209% |
| Example B2 | 0.55 | 0.4 | 0 | 0.05 | 10.1 | 0.3 | 1 | 0.28 | 0.44 | 0.28 | 5 | 0.85 | 2.20 | 443.0 | 96% | 287.0 | 114% | 210% |

Comparative Example C1, and Examples C1 and C2

Processes were performed in a similar manner as in Example 1 except that various conditions were changed as shown in Table 3.

In Examples in which the Ca/La atomic ratio at the grain boundary is within a specific range, it was confirmed that HcJ can be raised without excessively lowering Br, and the balance between Br and HcJ is excellent. Note that, in Comparative Example A2, since cracks occurred in the sintered magnet, a magnetism could not be measured. In

TABLE 3

| | Metal ratio (atomic ratio) of raw material powder (main phase) | | | | | | Addition amount with respect to calcined object of raw material powder | Composition of additional powder (molar ratio) | | | Temperature lowering rate from highest temperature of main firing to 1000° C. | Atomic ratio of two-grain boundary | | Br | Br ratio α with respect to Br in Comparative Example | HcJ | HcJ ratio β with respect to HcJ in Comparative Example | |
|---|---|---|---|---|---|---|---|---|---|---|---|---|---|---|---|---|---|---|
| | La | Ca | Sr | Ba | Fe | Co | wt % | SiO$_2$ | CaCO$_3$ | La(OH)$_3$ | (° C./min) | Ca/La | Si/La | (mT) | C1 | (kA/m) | C1 | α + β |
| Comparative Example C1 | 0 | 0 | 1 | 0 | 12 | 0 | 0 | 0.00 | 0.00 | 0.00 | 5 | — | — | 423 | 100% | 312 | 100% | 200% |
| Example C1 | 0 | 0 | 1 | 0 | 12 | 0 | 1 | 0.05 | 0.42 | 0.53 | 5 | 0.33 | 0.01 | 421 | 100% | 341 | 109% | 209% |
| Example C2 | 0 | 0 | 1 | 0 | 12 | 0 | 1 | 0.05 | 0.48 | 0.48 | 5 | 0.42 | 0.04 | 420 | 99% | 353 | 113% | 212% |

<Evaluation of Magnetic Characteristics>

After upper and lower surfaces of the ferrite sintered magnet were processed, and Br and HcJ at 20° C. were respectively measured by using a B—H tracer in which the maximum application magnetic field is 29 kOe.

<Composition Analysis>

The ferrite sintered magnet was processed by a focused ion beam (FIB) method using a focused ion beam device to obtain a thin piece having a thickness of 100 nm. With respect to the thin piece, element line analysis was performed from one ferrite crystal grain to another ferrite crystal grain vertically across a grain boundary phase by using STEM-EDS, and a concentration variation along a line of the metal element was measured. A measurement interval was set to 3 nm, and a metal element concentration of the two-grain boundary was obtained. The measurement was performed on five grain boundaries, and the obtained values were averaged to obtain a concentration of a grain boundary phase metal element, and an atomic ratio was obtained.

Results in the sintered magnet in each of Examples and Comparative Examples are shown in Table 1 to Table 3.

Comparative Example C1, Ca, La, and Si could not be confirmed at the grain boundary.

REFERENCE SIGNS LIST

4: ferrite crystal grain, 6: grain boundary phase, 6a: two-grain boundary, 6b: multi-grain boundary.

What is claimed is:

1. A ferrite sintered magnet, comprising:
a magnetoplumbite type ferrite crystal grains; and
a two-grain boundary interposed between the ferrite crystal grains,
the ferrite crystal grains contain Ca, the metal element R, Fe, and the metal element M,
wherein the metal element R is selected from the group consisting of Bi and rare-earth elements,
wherein the metal element M is selected from the group consisting of Zn, Cu, Mn, Al, Co, Ni, and Cr, wherein a metal composition of the ferrite sintered magnet satisfies the following Formula (5):

$$Ca_aA^2{}_bR_cFe_dM_e \qquad (5);$$

wherein, in the Formula (5), $A^2$ is at least one selected from the group consisting of Sr, Ba, and Pb; a is 0.15 or more and 0.7 or less, b is 0 or more and 0.45 or less, c is 0.3 or more and 0.85 or less, d is more than 9.35 and less than 11.90, e is 0.1 or more and 0.5 or less, and the sum of a, b, and c is 1, and the two-grain boundary contains Ca and La, and a Ca/La atomic ratio at the two-grain boundary is 0.3 to 3.0.

2. The ferrite sintered magnet according to claim 1, wherein the Ca/La atomic ratio at the two-grain boundary is 0.4 or more.

3. A ferrite sintered magnet, comprising:

a magnetoplumbite type ferrite crystal grains; and a two-grain boundary interposed between the ferrite crystal grains, wherein the two-grain boundary contains Ca and La, and a Ca/La atomic ratio at the two-grain boundary is 0.3 to 3.0 and the two-grain boundary further contains Si, and an Si/La atomic ratio at the two-grain boundary is 0.02 to 2.0.

4. The ferrite sintered magnet according to claim 2, wherein the two-grain boundary further contains Si, and an Si/La atomic ratio at the two-grain boundary is 0.02 to 2.0.

\* \* \* \* \*